United States Patent

[11] 3,532,055

[72] Inventor Brian Henry Wheeler, Hitchin, England

[21] Appl. No. 598,747
[22] Filed Dec. 2, 1966
[45] Patented Oct. 6, 1970
[73] Assignee Rotaprint Limited, London, England
[32] Priority Dec. 2, 1965
[33] Great Britain
[31] 51,249/65

[54] PRODUCTION OF PLATES FOR OFFSET LITHOGRAPHY
4 Claims, 2 Drawing Figs.

[52] U.S. Cl. .......... 101/456, 101/457, 101/467, 96/33
[51] Int. Cl. .......... B41n 1/00, B41n 3/00
[50] Field of Search .......... 101/456–459, 149.2; 96/91D; 96/33

[56] References Cited

UNITED STATES PATENTS

| | | | |
|---|---|---|---|
| 2,584,317 | 2/1952 | Aller | 101/459X |
| 3,201,239 | 8/1965 | Neugebauer et al. | 96/91(D)UX |
| 3,382,069 | 5/1968 | Borchers et al. | 96/33 |

FOREIGN PATENTS

| | | | |
|---|---|---|---|
| 475,902 | 11/1937 | Great Britain | 101/149 |
| 938,233 | 1/1956 | Germany | 96/91(D)UX |

*Primary Examiner*—Robert E. Pulfrey
*Assistant Examiner*—Clifford D. Crowder
*Attorney*—Woodhams, Blanchard and Flynn

ABSTRACT: A lithographic printing plate and a process for producing same wherein a coating of photomechanical material is applied to the surface of a chromium layer on a substrate. The coating is exposed to a patterned light transmitting mask and the exposed coating is developed to remove the unhardened or softened photomechanical material so as to leave a hardened or unsoftened hydrophobic residue on predetermined areas of the chromium surface. The removed coating exposes the underlying chromium surface which defines a hydrophilic surface constituting the nonimage areas. The residue remaining on the predetermined areas of the chromium surface constitute the image areas of the finished lithographic plate.

PRODUCTION OF PLATES FOR OFFSET LITHOGRAPHY

Figure 1:
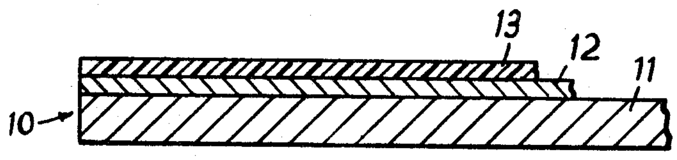

The present invention relates to the production of plates for offset lithography.

Conventional photosensitised surface plates are based on aluminum or anodized aluminum and are manufactured by coating a surface of a sheet of the metal with a photomechanical material, which is subsequently exposed to light behind an original and then developed with a developer which removes the unhardened or softened material to leave a hydrophobic image on the plate. The uncovered surface of the metal plate provides the hydrophilic nonimage areas.

Bimetal plates have also been produced, which commonly consist of copper and chromium layers, the former being hydrophobic in character and the latter hydrophilic. With these plates, an etch resist coating on the chromium surface is exposed behind an original, the exposed coating is developed, and the resulting plate is etched, for example with concentrated hydrochloric acid, to remove the portions of the chromium surface revealed by development of the resist and so to uncover the underlying hydrophobic copper layer, which provides the image areas.

The advantages of the conventional aluminum plates lie in their cheapness and simplicity of production. The bimetal plate is more costly, requires lengthy processing after exposure and necessitates the use of highly corrosive etching media, but this plate has great durability and can withstand very long printing runs. It also has the advantage that, by virtue of the great contrast between the hydrophilic properties of the chromium layer and the hydrophobic properties of the copper layer, the plate is very clean working. Nevertheless, high cost and difficulties of processing have largely confined the use of the bimetal plate to very long runs.

It has now surprisingly been found that a plate having a durability hitherto only obtainable with a bimetal plate can be made by applying a photomechanical coating to a chromium surface, while processing is confined to the exposure and development of the photomechanical material, which can easily be carried out by the printer. The degree of adhesion of the residual hydrophobic photomechanical material to the chromium surface has surprisingly been found to be greater than to the surface layer of anodized aluminum or to the layer of oxide normally occurring on an unanodized aluminum surface.

Accordingly, the present invention provides a method of producing a plate for offset lithography in which a coating of a photomechanical material is applied to a surface of chromium supported on a substrate, the coating is exposed behind an original, and the exposed coating is developed to remove the unhardened or softened photomechanical material from the hardened or unsoftened hydrophobic residue and reveal the underlying chromium surface. The product of the invention is thus an offset plate which comprises a chromium surface supported on a substrate and a hydrophobic coating on predetermined areas of the surface constituting the image areas of the plate.

The invention also provides presensitized stock from which offset plates can be prepared, such stock comprising a chromium surface supported on a substrate and a coating of a presensitized photomechanical material on the said surface, the said material being such that after exposure and development a hydrophobic coating remains on the surface in the image areas.

The substrate should be one which will afford adequate support for the chromium surface and is preferably such that the finished plate has the qualities of thickness and flexibility which enable it to be used on conventional offset machines. The preferred plate is formed on a bimetallic sheet of copper or copper alloy and chromium, similar to those employed in the production of bimetal plates by the etching process. Instead of copper, however, other backings may be employed; for example a thin film of chromium may be formed on or laminated with a sheet material to achieve a thickness suitable for normal offset printing work.

Where a metal base, for example of copper or copper alloy, is employed, the chromium layer can conveniently be formed by electrodeposition. Although a bright chromium deposit can be employed it is preferred at present to use a matt or spongy chromium deposit. The chromium layer may be of the order of 1.5 microns in thickness. Where an even chromium deposit is achieved, this thickness can be further reduced, with corresponding economies in the quantity of chromium employed.

The photomechanical material may be either photohardening or photosoftening. In the former case, a negative original is employed, in the latter case a positive original. The photomechanical material which is preferred at present is a novolak resin containing a diazide light sensitive compound, commonly referred to as a diazo-sensitized novolak, which can readily be developed with alkaline aqueous solution.

The invention provides an offset printing plate which not only has much greater durability than aluminum or anodized aluminum plates, but yields better prints than these known plates, inasmuch as larger solid areas can be printed without causing the nonimage areas to accept ink.

The following is one example of the production of a chromium plate according to the invention, and of a comparable anodized aluminum plate.

A solution of photosensitive material is prepared containing the following:

| | |
|---|---|
| 6-benzoyl-3-(1,2-naphthoquinone-2-diazide-5-sulphonyl) pyrogallol, g | 2 |
| Novolak resin (cresol-formaldehyde condensate), g | 4 |
| Dimethylformamide, ml | 10 |

An aluminum plate is made by coating this solution on an anodized aluminum foil, which is then exposed to actinic radiation behind a positive original and washed with 5 percent aqueous trisodium phosphate solution to remove the exposed areas of the coating. A positive lithographic plate is obtained which will yield 30,000 copies.

Now in accordance with one embodiment of the invention, the same solution is coated on the chrome surface of a plate consisting of an electrodeposited layer of chromium 1.5 microns in thickness on a brass base of 0.006 thickness, to produce a coating thickness of 2.5 microns. Presensitized stock according to the invention is thereby produced. After exposure and development as before, a plate is obtained which will yield 60,000 —100,000 copies.

Figure 2:
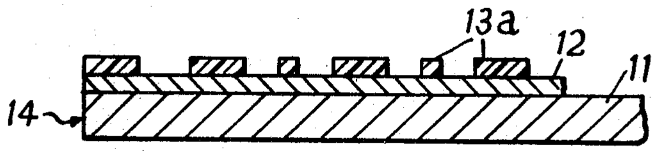

The invention is illustrated in the accompanying drawings, in which:

FIG. 1 is a diagrammatic cross section of presensitized plate stock according to the invention: and FIG. 2 is a diagrammatic cross section of an offset plate embodying the invention.

In FIG. 1 the stock 10 comprises a copper or brass base sheet 11 covered by an electrodeposited chromium layer 12, which is in turn covered by a layer of photosensitive material 13 produced, for example, by means of the solution earlier described.

In FIG. 2, the stock 10 has been exposed and developed as described above to form a plate 14, the residual portions **13*a*** of the photomechanical material now being hydrophobic and directly constituting the image elements of the finished printing plate.

I claim:

1. A method of producing a lithographic printing plate having image elements thereon, consisting of the steps of:

1. providing a substrate having thereon a surface layer of hydrophilic chromium metal with said substrate providing adequate support for said chromium surface layer and having a thickness and flexibility which will enable same to be used on conventional offset printing machines;
2. applying to said hydrophilic chromium surface a coating consisting of a photomechanical material which, after exposure and development, yields a hydrophobic residue, said coating consisting of a novolak resin containing a diazide light sensitive compound with said coating adhering to said chromium surface;

3. exposing said coating behind a patterned light transmitting mask so that only a portion of said coating is exposed to light; and
4. then, without further treatment of said coating, directly developing said exposed coating to:
a.- leave a residual coating of hydrophobic material derived solely from said photomechanical material on predetermined areas of said chromium surface with said predetermined areas directly constituting the hydrophobic image elements of the finished printing plate; and
b. remove said coating and thereby expose said hydrophilic chromium surface in the remaining areas of said plate with said remaining areas of chromium surface directly constituting the hydrophilic nonimage areas of the finished printing plate whereby to form a lithographic printing plate having an unbroken hydrophilic chromium surface, which surface is exposed in nonimage areas and covered in image areas by a hydrophobic photomechanical residue comprising the inkable printing element.

2. A method of producing a lithographic printing plate having image elements thereon comprising the steps of:
1. providing a substrate having thereon a surface layer of hydrophilic chromium metal with said substrate providing adequate support for said chromium surface layer and having a thickness and flexibility which will enable same to be used on conventional offset printing machines;
2.- applying to said chromium surface a coating of photomechanical material consisting of a novolak resin containing a diazide light sensitive compound which, after exposure and development, yields a hydrophobic residue;
3.-exposing said coating behind a patterned light transmitting mask so that only a portion of said coating is exposed to light; and
4. then, without further treatment of said coating, producing a finished printing plate suitable for direct use in a lithographic printing process by developing said exposed coating to:
a. leave a residual coating consisting of a hydrophobic residue of said material on predetermined areas of said chromium surface with said predetermined areas directly constituting the hydrophobic image elements of the finished printing plate; and
b. expose said chromium surface in the remaining areas of said plate with said remaining areas of chromium surface directly and without further treatment constituting the hydrophilic nonimage areas of the finished printing plate.

3. An offset lithographic printing plate having image elements thereon, comprising:
a base member comprising a metallic substrate with said base member providing adequate support for a chromium surface layer thereon and having a thickness and flexibility enabling it to be used on conventional offset lithographic printing machines;
a thin hydrophilic chromium metal surface layer on one surface of said base member;
a hydrophobic coating of exposed photomechanical material on and adhered to the surface of said hydrophilic chromium metal layer, said coating of exposed photomechanical material comprising the residue of a novolak resin containing a diazide light sensitive compound, and said photomechanical material only covering predetermined surface areas of said hydrophilic layer with the remaining surface areas of said layer being exposed;
said predetermined areas of photomechanical material being uncovered and directly constituting the hydrophobic image elements of the finished printing plate; and
said exposed surface areas of said chromium layer directly constituting the hydrophilic nonimage areas of the finished printing plate.

4. A lithographic printing process, comprising the steps of:
1. preparing a finished lithographic printing plate by:
a. providing a substrate having thereon a surface layer of hydrophilic chromium metal with said substrate having sufficient thickness and flexibility to enable it to be mounted on conventional lithographic printing machines,
b. applying to said chromium surface layer a coating consisting of a photomechanical material which, after exposure and development, yields a hydrophobic residue, said photomechanical material comprising a novolak resin containing a diazide light sensitive compound,
c. exposing said coating behind a patterned light transmitting mask whereby only a portion of the area of the coating is exposed, and
d. then, without further treatment of said coating, developing said exposed coating to leave a residual coating of said residue, derived solely from said photomechanical material, on predetermined areas of said surface layer with the remaining areas of said chromium surface layer being exposed; and
2. mounting said finished printing plate in a lithographic printing machine with said predetermined areas of residue directly constituting hydrophobic image areas of the finished plate and with the remaining areas of exposed chromium surface layer directly constituting the hydrophilic nonimage areas of the finished printing plate.